US012285937B2

(12) United States Patent
Noda et al.

(10) Patent No.: US 12,285,937 B2
(45) Date of Patent: Apr. 29, 2025

(54) PRINTING APPARATUS AND CONTROL METHOD FOR PRINTING APPARATUS

(71) Applicant: BROTHER KOGYO KABUSHIKI KAISHA, Nagoya (JP)

(72) Inventors: Masahiro Noda, Ogaki (JP); Atsushi Ito, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 172 days.

(21) Appl. No.: 18/324,302

(22) Filed: May 26, 2023

(65) Prior Publication Data

US 2023/0382134 A1 Nov. 30, 2023

(30) Foreign Application Priority Data

May 27, 2022 (JP) ................................ 2022-086746

(51) Int. Cl.
*B41J 11/00* (2006.01)

(52) U.S. Cl.
CPC ............................... *B41J 11/00212* (2021.01)

(58) Field of Classification Search
CPC ....................... B41J 11/00212; B41J 11/00214
See application file for complete search history.

(56) References Cited

U.S. PATENT DOCUMENTS

2007/0109382 A1* 5/2007 Lafleche ............ B41J 11/00214
347/102

FOREIGN PATENT DOCUMENTS

JP 2015-63057 A 4/2015

* cited by examiner

*Primary Examiner* — Bradley W Thies
(74) *Attorney, Agent, or Firm* — Merchant & Gould P.C.

(57) ABSTRACT

There is provided a printing apparatus including: a first head including first nozzles; a first irradiator including first light sources; and a controller. The first nozzles are arranged to constitute a nozzle row. The first light sources are arranged to constitute a light source row, and including an inner light source, and first and second outer light sources. The controller is configured to cause: the first head to execute a first discharging operation of discharging a clear ink to a printing medium; and the first irradiator to execute a first irradiating operation of irradiating the clear ink with a light. The controller is configured to make an intensity of the light, from each of the first and second outer light sources, with which the clear ink is irradiated smaller than an intensity of the light, from the inner light source, with which the clear ink is irradiated.

8 Claims, 7 Drawing Sheets

FIG. 7

| INTENSITY OF LIGHT FROM FIRST OUTER LIGHT SOURCE /INTENSITY OF LIGHT FROM INNER LIGHT SOURCE | INTENSITY OF LIGHT FROM SECOND OUTER LIGHT SOURCE /INTENSITY OF LIGHT FROM INNER LIGHT SOURCE | GRADIENT θ OF LIGHT INTENSITY DISTRIBUTION/ GRADIENT θ WHEN LIGHT INTENSITY IS 100% |
|---|---|---|
| 100% | 100% | 1.000(θ0) |
| 90% | 90% | 0.949 |
| 80% | 80% | 0.881 |
| 70% | 70% | 0.902 |
| 70% | 50% | 0.925 |
| 70% | 0% | 0.902 |
| 50% | 70% | 0.925 |
| 50% | 50% | 0.949 |
| 30% | 50% | 1.000 |

PRINTING APPARATUS AND CONTROL METHOD FOR PRINTING APPARATUS

REFERENCE TO RELATED APPLICATIONS

This application claims priority from Japanese Patent Application No. 2022-086746 filed on May 27, 2022. The entire content of the priority application is incorporated herein by reference.

BACKGROUND ART

Conventionally, an ink-jet printer including an ink head configured to discharge or eject a clear ink of photo curing type to a medium being conveyed in sub-scanning direction, and an irradiating means for irradiating the clear ink with a light is known. The light indicates an irradiation distribution waveform that rises gradually from the upstream end in the sub-scanning direction, reaches the maximum point at a position near the downstream end in the sub-scanning direction, and falls steeply from the maximum point to the downstream end in the sub-scanning direction.

DESCRIPTION

An ink-jet printer described in Japanese Patent Application Laid Open No. 2015-63057 intends to reduce occurrence of a line (streak) on a surface of the clear ink by gradually rising the irradiation distribution waveform of the light, from the irradiating means, with which the clear ink is irradiated from the upstream end in the sub-scanning direction. However, the irradiation distribution waveform of the light with which the clear ink is irradiated steeply falls in the range near the downstream end in the sub-scanning direction towards the downstream end in the sub-scanning direction, and thus a part of the clear ink cured by the light in this range is thin in the sub-scanning direction. Therefore, a line or a streak may occur in the clear ink at a boundary between a cured part and an uncured part due to reflection of the light at the boundary caused by difference in a refractive index between the cured part and the uncured part.

An object of a present disclosure is to provide a printing apparatus and a control method for a printing apparatus capable of reducing occurrence of a line or a streak in a clear ink.

According to an aspect of the present disclosure, there is provided a printing apparatus including:

- a first head including a plurality of first nozzles configured to discharge a clear ink having photo-curing property to a printing medium;
- a first irradiator including a plurality of first light sources configured to irradiate the clear ink on the printing medium with a light;
- a carriage configured to move the first head and the first irradiator in a first direction;
- a conveyor configured to convey the printing medium in a second direction crossing the first direction; and
- a controller.

The plurality of first nozzles is arranged along the second direction so as to constitute a nozzle row.

The plurality of first light sources is arranged along the second direction so as to constitute a light source row longer than the nozzle row, the plurality of first light sources including an inner light source, a first outer light source and a second outer light source, the inner light source being interposed between the first and second outer light sources in the second direction.

In a case that a center in the second direction of the light source row and a center in the second direction of the nozzle row are aligned with each other in the second direction, the inner light source is positioned within a range over which the nozzle row extends, and the first and second outer light sources are positioned outside the range over which the nozzle row extends.

The controller is configured to cause:

- the first head to execute a first discharging operation of discharging the clear ink to the printing medium; and
- the first irradiator to execute a first irradiating operation of irradiating the clear ink on the printing medium with the light from the first irradiator.

The controller is configured to make an intensity of the light, from each of the first and second outer light sources, with which the clear ink is irradiated smaller than an intensity of the light, from the inner light source, with which the clear ink is irradiated, in the first irradiating operation.

According to an aspect of the present disclosure, there is provided a control method for a printing apparatus, the printing apparatus including:

- a first head including a plurality of first nozzles configured to discharge a clear ink having photo-curing property to a printing medium;
- a first irradiator including a plurality of first light sources configured to irradiate the clear ink on the printing medium with a light;
- a carriage configured to move the first head and the first irradiator in a first direction; and
- a conveyor configured to convey the printing medium in a second direction crossing the first direction.

The plurality of first nozzles is arranged along the second direction so as to constitute a nozzle row.

The plurality of first light sources is arranged along the second direction so as to constitute a light source row longer than the nozzle row, the plurality of first light sources including an inner light source, a first outer light source and a second outer light source, the inner light source being interposed between the first and second outer light sources in the second direction.

In a case that a center in the second direction of the light source row and a center in the second direction of the nozzle row are aligned with each other in the second direction, the inner light source is positioned within a range over which the nozzle row extends, and the first and second outer light sources are positioned outside the range over which the nozzle row extends.

The method includes:

- causing the first head to execute a first discharging operation of discharging the clear ink to the printing medium;
- causing the first irradiator to execute a first irradiating operation of irradiating the clear ink on the printing medium with the light from the first irradiator; and
- making an intensity of the light, from each of the first and second outer light sources, with which the clear ink is irradiated smaller than an intensity of the light, from the inner light source, with which the clear ink is irradiated, in the first irradiating operation.

According to the present disclosure, it is possible to provide a printing apparatus and a control method for a printing apparatus capable of reducing occurrence of a line or a streak in a clear ink.

Above object, other object(s), feature(s) and advantage(s) of the present disclosure will be clarified, with reference to the attached drawings, by a detailed explanation on embodiments described below.

FIG. 7 is a table depicting a correspondence among an intensity of a light from a first outer light source, an intensity of a light from a second outer light source, and a gradient of a graph of a light intensity distribution, in the first irradiating part.

Figure 8A:
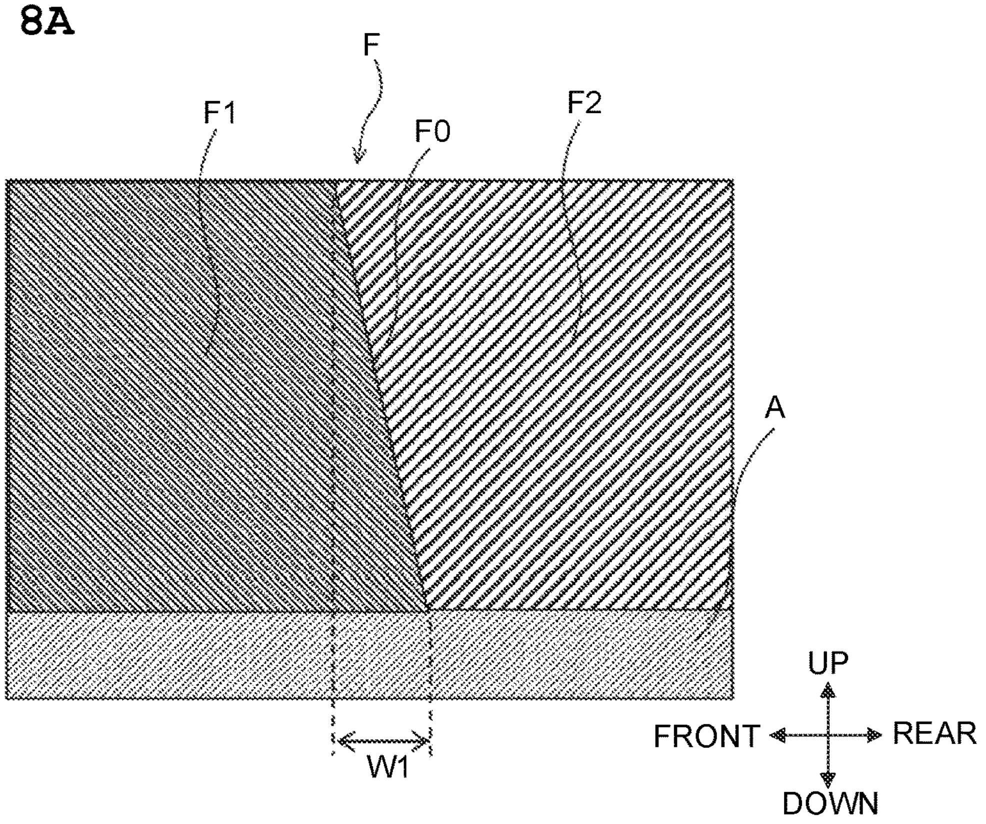
Figure 8B:
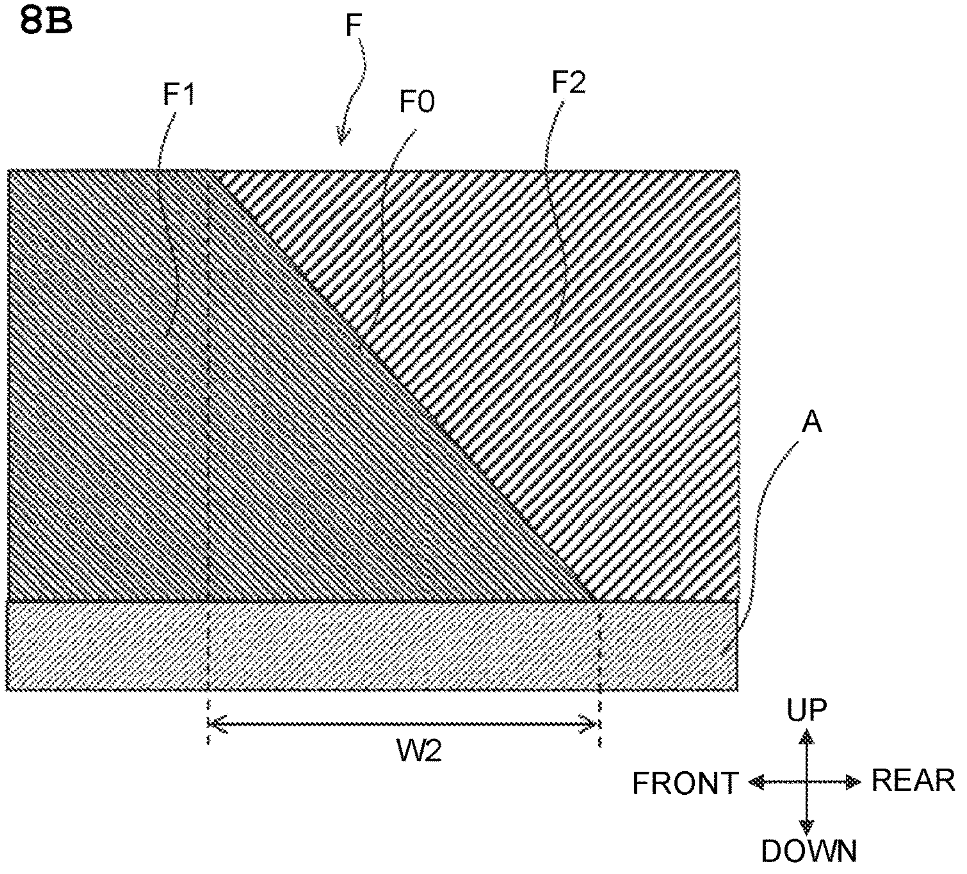

FIG. 8A depicts a cross-sectional view of a clear ink in a case that the clear ink is irradiated with a light of which light intensity distribution has small gradient. FIG. 8B depicts a cross-sectional view of a clear ink in a case that the clear ink is irradiated with a light of which light intensity distribution has a gradient larger than the gradient of the light used in the case depicted in FIG. 8A.

In the following, an embodiment of the present disclosure will be described concretely, with reference to the drawings. Note that, in the following, same reference signs are used for same elements or corresponding elements throughout all drawings.

<Printing Apparatus>

Figure 1:
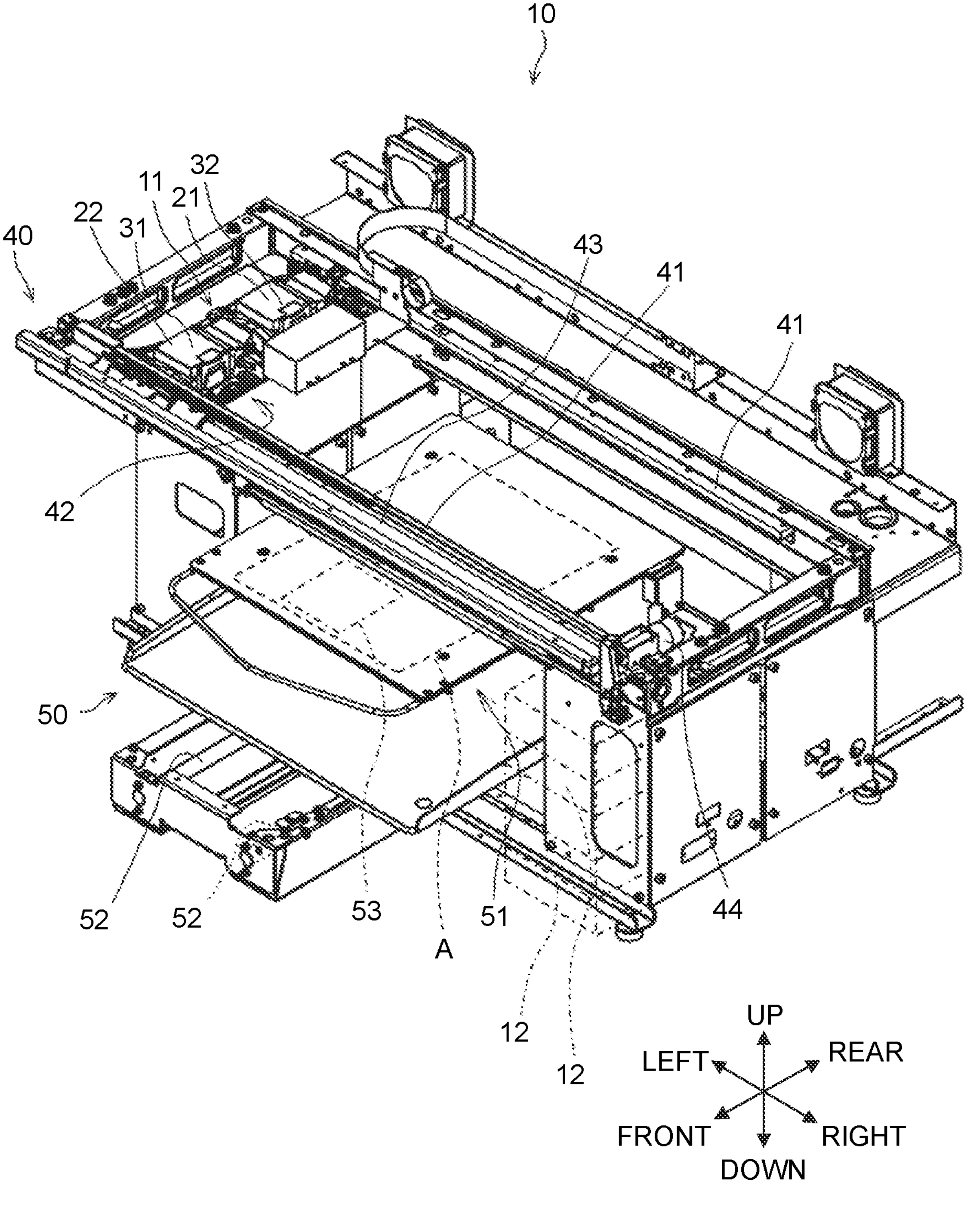
FIG. 1 is a perspective view of a printing apparatus.

A printing apparatus 10 according to an aspect of the present disclosure is, for example, an ink-jet printer configured to print an image on a printing medium A with an ink by discharging the ink from heads 21, 22 to the printing medium A and irradiating the ink on the printing medium A with lights from irradiating parts 31, 32, as depicted in an example of FIG. 1. Note that the printing apparatus 10 is not limited to ink-jet printers. The printing medium A has, for example, a fabric, a textile, a cloth, a paper, and the like having a sheet shape or, a mug, a ball, and the like having a three-dimensional shape. The ink is a photo-curing ink, such as an ink configured to be cured by a light with which the ink is irradiated, for example.

Figure 2:
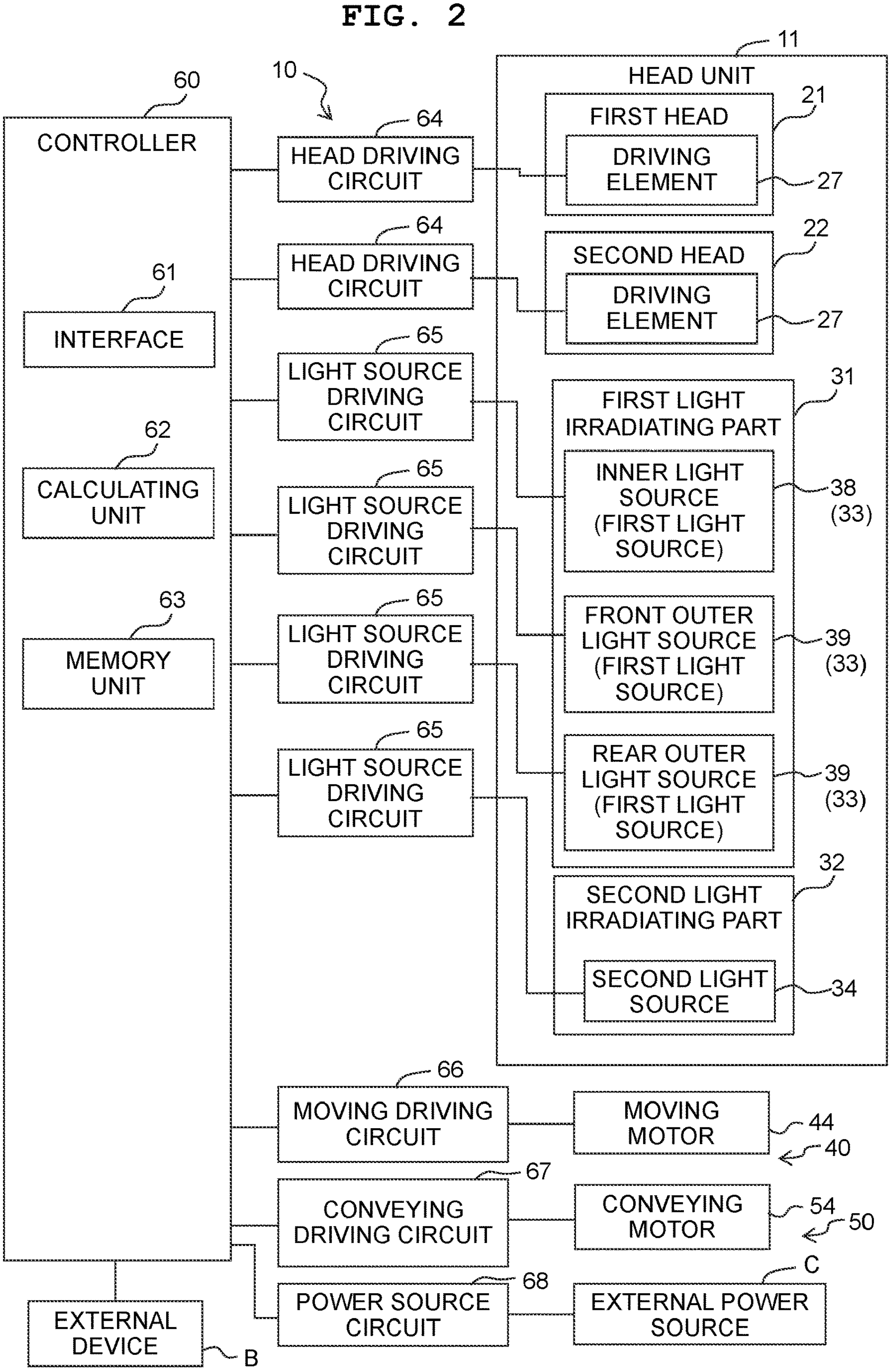
FIG. 2 is a functional block diagram depicting a configuration of the printing apparatus of FIG. 1

The printing apparatus 10 includes a head unit 11 having the heads 21, 22, and the irradiating parts 31, 32, tanks 12, a moving device 40, a conveying device (conveyor) 50, and a controller 60 (FIG. 2). Note that the details of the controller 60 will be described later. A first direction in which the heads 21, 22 and the irradiating parts 31, 32 are moved by the moving device 40 is referred to as a left-right direction. A second direction crossing (for example, orthogonal to) the first direction is referred to as a front-rear direction. A direction crossing (for example, orthogonal to) the first and second directions is referred to as an up-down direction. However, an arrangement of the printing apparatus 10 is not limited thereto.

The moving device 40 includes a pair of moving rails 41, a carriage 42, a driving belt 43, and a moving motor 44, and is configured to move the head unit 11 in the left-right direction. The pair of moving rails 41 are each an elongated member extending in the left-right direction, and are arranged parallel to each other so that the head unit 11 is interposed between the pair of moving rails 41 in the front-rear direction. The head unit 11 is mounted on the carriage 42, and the carriage 42 is supported by the pair of moving rails 41 such that the carriage 42 is movable along the pair of moving rails 41 in the left-right direction. The driving belt 43 is an endless belt. The driving belt 43 extends in the left-right direction along the pair of moving rails 41, is connected to the carriage 42, and is connected to the moving motor 44 via pulley(s). If the driving motor 44 drives the driving belt 43, then the carriage 42 will be moved forwardly and backwardly in the left-right direction along the pair of moving rails 41. By doing so, the moving device 40 moves the heads 21, 22 and the irradiating parts 31, 32 in the left-right direction.

The conveying mechanism 50 includes a platen 51, a conveying rail 52, a platen support base 53, and a conveying motor 54 (FIG. 2). The upper surface of the platen 51 faces or is opposed to the lower surfaces of the heads 21, 22 and the lower surfaces of the irradiating parts 31, 32. The platen 51 supports the printing medium A in a state that the printing medium A is placed on the upper surface of the platen 51. The platen 51 defines gaps between the printing medium A and each of the heads 21, 22 and the irradiating parts 31, 32 in the up-down direction. The conveying rail 52 extends in the front-rear direction. The platen support base 53 supports, for example, the platen 51. The platen support base 53 is supported such that the platen support base 53 is movable along the conveying rail 52 in the front-rear direction. The platen support base 53 is connected to the conveying motor 54. The conveying motor 54 moves the platen 51 in the front-rear direction by driving the platen support base 53. By doing so, the conveying device 50 conveys the printing medium A frontward, for example.

The tanks 12 are each a container for storing the ink having a photo-curing property. The tanks 12 are connected to the heads 21, 22 via a supplying tube, are configured to supply the ink to the heads 21, 22 via the supplying tube. The tanks 12 include, for example, a base tank 12, a clear tank 12, and a plurality of color tanks 12. The base tank 12 stores a base ink such as a white ink etc. The clear tank 12 stores a clear ink. Each of the color tanks 12 stores, for example, one of a cyan ink, a magenta ink, a yellow ink and a black ink.

<Head Unit>

Figure 3:
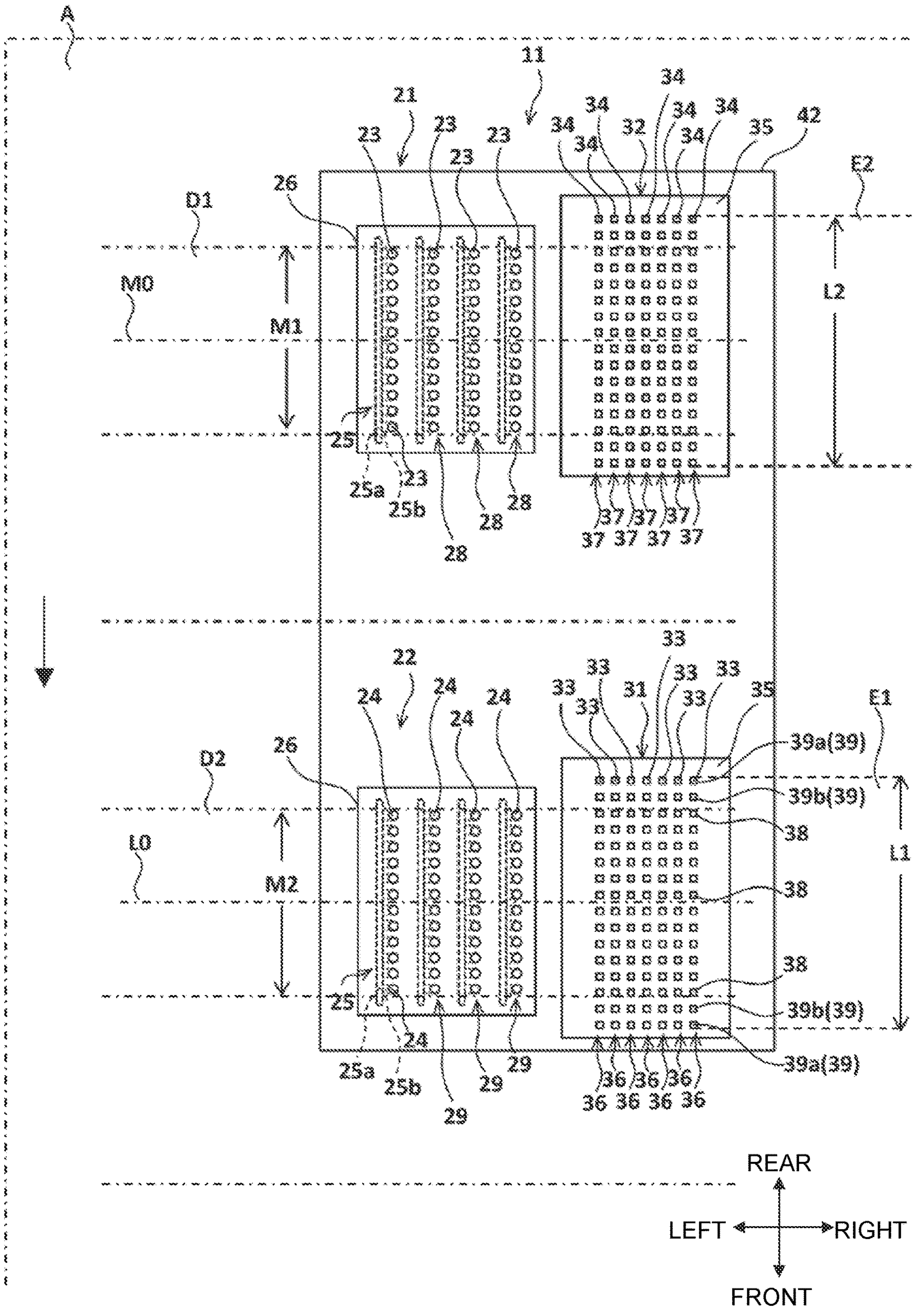
FIG. 3 is a schematic view seeing the head unit of FIG. 1 from the above.

As depicted in FIG. 3, the head unit 11 includes a first head 21, a second head 22, a first irradiating part (first light irradiating part, first irradiator) 31, and a second irradiating part (second light irradiating part, second irradiator) 32. The first head 21 and the second head 22 are arranged side by side along the front-rear direction, and the first head 21 is arranged in rear of the second head 22. The first irradiating part 31 and the second irradiating part 32 are arranged side by side along the front-rear direction, and the first irradiating part 31 is arranged in front of the second irradiating part 32. The first irradiating part 31 and the second head 22 are arranged side by side along the left-right direction, and the first irradiating part 31 is arranged in right of the second head 22. The second irradiating part 32 and the first head 21 are arranged side by side along the left-right direction, and the second irradiating part 32 is arranged in right of the first head 21.

The first head 21 includes a plurality of first nozzles 23, an ink channel 25, a channel forming body 26, and a plurality of driving elements 27 (FIG. 2). The plurality of first nozzles 23 includes, for example, a nozzle configured to discharge or eject a clear ink having photo-curing property to the printing medium A, and a nozzle configured to discharge or eject a base ink having photo-curing property to the printing medium A. The plurality of first nozzles 23 constructs a first nozzle row 28 by being arranged along the front-rear direction with intervals. In the first head 21, a plurality of first nozzle rows 28 is arranged in the left-right direction with intervals. The plurality of first nozzle rows 28 includes the first nozzle row 28 for the base ink and the first nozzle row 28 for the clear ink.

The second head 22 includes a plurality of second nozzles 24, an ink channel 25, a channel forming body 26, and a plurality of driving elements 27 (FIG. 2). The plurality of second nozzles 24 is nozzles each configured to discharge or eject a color ink having photo-curing property to the printing medium A. The plurality of second nozzles 24 construct a second nozzle row 29 by being arranged along the front-rear direction with intervals. In the second head 22, a plurality of second nozzle rows 29 is arranged in the left-right direction with intervals. The plurality of second nozzle rows 29 includes the second nozzle row 29 for the cyan ink, the second nozzle row 29 for the magenta ink, the second nozzle row 29 for the yellow ink, and the second nozzle row 29 for the black ink.

For example, a size M1 of the first nozzle row 28 in the front-rear direction and a size M2 of the second nozzle row 29 in the front-rear direction are identical to each other. The size M1 of the first nozzle row 28 is a distance between the first nozzle 23 positioned at the front end of the first nozzle row 28 and the first nozzle 23 positioned at the rear end of the first nozzle row 28. The size M2 of the second nozzle row 29 is a distance between the second nozzle 24 positioned at the front end of the second nozzle row 29 and the second nozzle 24 positioned at the rear end of the second nozzle row 29. Under such a configuration, a size in the front-rear direction of a landing area D1, that is an area on the printing medium A into which the ink discharged from the first nozzle row 28 lands, and a size in the front-rear direction of a landing area D2, that is an area on the printing medium A into which the ink discharged from the second nozzle row 29 lands, are identical to each other.

The channel forming bodies 26 each have, for example, a rectangular parallelopiped shape. The first nozzles 23 and an ink channel 25 are formed in the channel forming body 26 of the first head 21. The first nozzles 23 are opened on the lower surface of the channel forming body 26 of the first head 21. The ink channel 25 is connected to the tank 12 (FIG. 1), and the first nozzles 23. The ink channel 25 has in a route between the tank 12 and the first nozzles 23, a common channel 25*a* and a plurality of individual channels 25*b*. The common channel 25*a* communicates with the tank 12. The common channel 25*a* extends in the channel forming body 26 of the first head 21 along the front-rear direction, and is connected to the plurality of individual channels 25*b*. In the channel forming body 26 of the first head 21, the plurality of individual channels 25*b* is arranged in the front-rear direction, is connected to the common channel 25*a*, and is connected to the first nozzles 23, respectively. Thus, the ink flows from the tank 12 to the common channel 25*a* in the channel forming body 26 of the first head 21, is distributed to the individual channels 25*b* while flowing in the common channel 25*a* in the front-rear direction, and then, is supplied to the first nozzles 23. Similarly, the second nozzles 24 and an ink channel 25 are formed in the channel forming body 26 of the second head 22. The second nozzles 24 are opened on the lower surface of the channel forming body 26 of the second head 22. The ink channel 25 is connected to the tank 12 (FIG. 1), and the second nozzles 24. The ink channel 25 has in a route between the tank 12 and the second nozzles 24, a common channel 25*a* and a plurality of individual channels 25*b*. The common channel 25*a* communicates with the tank 12. The common channel 25*a* extends in the channel forming body 26 of the second head 22 along the front-rear direction and connected to the plurality of individual channels 25*b*. In the channel forming body 26 of the second head 22, the plurality of individual channels 25*b* is arranged in the front-rear direction, is connected to the common channel 25*a*, and is connected to the second nozzles 24, respectively. Thus, the ink flows from the tank 12 to the common channel 25*a* in the channel forming body 26 of the second head 22, is distributed to the individual channels 25*b* while flowing in the common channel 25*a* in the front-rear direction, and then, is supplied to the second nozzles 24.

For example, the first nozzles 23 in the first nozzle row 28 for the base ink communicate with the base tank 12, and thus the base ink is supplied to those first nozzles 23 from the base tank 12. The first nozzles 23 in the first nozzle row 28 for the clear ink communicate with the clear tank 12, and thus the clear ink is supplied to those first nozzles 23 from the clear tank 12. The second nozzles 24 in the second nozzle row 29 for the cyan ink communicate with the color tank 12 for the cyan ink, and thus the cyan ink is supplied to those second nozzles 24 from the color tank 12 for the cyan ink. The second nozzles 24 in the second nozzle row 29 for the magenta ink communicate with the color tank 12 for the magenta ink, and thus the magenta ink is supplied to those second nozzles 24 from the color tank 12 for the magenta ink. The second nozzles 24 in the second nozzle row 29 for the yellow ink communicate with the color tank 12 for the yellow ink, and thus the yellow ink is supplied to those second nozzles 24 from the color tank 12 for the yellow ink. The second nozzles 24 in the second nozzle row 29 for the black ink communicate with the color tank 12 for the black ink, and thus the black ink is supplied to those second nozzles 24 from the color tank 12 for the black ink.

Each of the driving elements 27 is a piezoelectric element etc., is provided corresponding to the individual channel 25*b*, and is configured to drive so as to vary the volume of the individual channel 25*b*. Thus, a pressure for discharging the ink from the nozzle 23 or the nozzle 24 is applied to the ink in the individual channel 25*b*, and the ink discharged from the nozzle 23 or the nozzle 24 lands on the printing medium A. Note that the driving element 27 is not limited to the piezoelectric element. For example, a thermal actuator such as a heating resistor for generating bubbles, an electrostatic actuator such as an electrode for generating an electrostatic force etc. may be used as the driving element 27.

The first irradiating part 31 includes a plurality of first light sources 33, and a circuit board 35 on which the plurality of first light sources 33 is mounted. The second irradiating part 32 includes a plurality of second light source 34 and a circuit board 35 on which the plurality of second light source 34 is mounted. Each of the circuit board 35 of the first irradiating part 31 and the circuit board 35 of the second irradiating part 32 includes, for example, a plate made of insulating material, and trace made of conductor arranged on the lower surface of the plate. The first light sources 33 are connected to the trace of the circuit board 35 of the first irradiating part 31, and the second light sources 34 are connected to the trace of the circuit board 35 of the second irradiating part 32. Each of the light sources 33, 34 is a light emitting element such as, for example, a LED, and is configured to emit a light (for example, an ultraviolet ray or an infrared ray) for curing the inks discharged from the nozzles 23, 24.

The plurality of first light sources 33 is arranged in the front-rear direction so as to constructs a first light source row 36. In the first irradiating part 31, a plurality of first light source rows 36 is arranged in the left-right direction with intervals. The plurality of second light sources 34 is arranged in the front-rear direction so as to constructs a second light source row 37. In the second irradiating part 32, a plurality of second light source rows 37 is arranged in the left-right direction with intervals.

For example, in the front-rear direction, a size L1 of the first light source row 36 and a size L2 of the second light source row 37 are longer than the size M1 of the first nozzle row 28 and the size M2 of the second nozzle row 29. The size L1 of the first light source row 36 is a distance between the first light source 33 positioned at the front end of the first light source row 36 and the first light source 33 positioned at the rear end of the first light source row 36. The size L2 of the second light source row 37 is a distance between the second light source 34 positioned at the front end of the second light source row 37 and the second light source 34 positioned at the rear end of the second light source row 37. Under such a configuration, in the front-rear direction, each of a size of an irradiating area E1 being an area in which the printing medium A is irradiated with the light from the first light source row 36, and a size of an irradiating area E2 being an area in which the printing medium A is irradiated with the light from the second light source row 37 is longer than each of the size of the landing area D1 of the ink from the first nozzle row 28 and the size of the landing area D2 of the ink from the second nozzle row 29. Further, for example, in the front-rear direction, the size L1 of the first light source row 36 and the size L2 of the second light source row 37 are identical to each other, and the size of the irradiating area E1 of the light from the first light source row 36 and the size of the irradiating area E2 of the light from the second light source row 37 are identical to each other.

<First Light Source>

Figure 4:
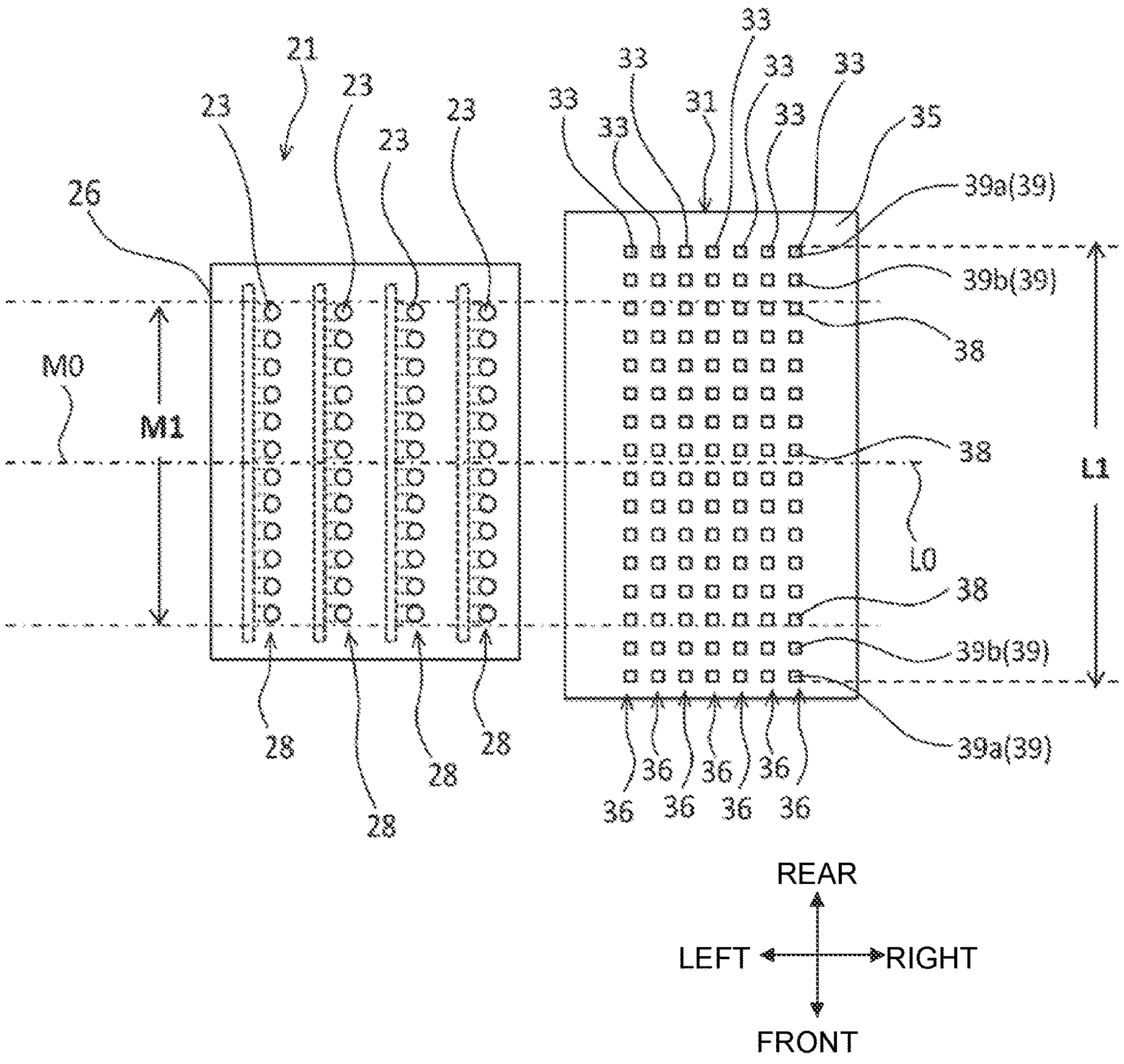
FIG. 4 is a schematic view of a first irradiating part and a first head in a case that the center of a first light source row and the center of a first nozzle row are aligned with each other.

As depicted in the example of FIG. 4, the size L1 of the first light source row 36 is larger (longer) than the size M1 of the first nozzle row 28. Thus, in a case that the center L0 in the front-rear direction of the first light source row 36 and the center M0 in the front-rear direction of the first nozzle row 28 are aligned with each other (adjusted such that the center L0 and the center M0 are positioned at the same position in the front-rear direction), inner light sources 38 being a part of the light sources 33 are positioned within a range in the front-rear direction over which the first nozzle row 28 extends, and outer light sources 39 being remaining light sources 33 are positioned outside the range in the front-rear direction over which the first nozzle row 28 extends. In such a configuration, in the front-rear direction, the frontmost inner light source 38 is positioned at the same position as the frontmost first nozzle 23 of the first nozzle row 28, or is positioned in rear of the frontmost first nozzle 23 of the first nozzle row 28. In the front-rear direction, the rearmost inner light source 38 is positioned at the same position as the rearmost first nozzle 23 of the first nozzle row 28, or is positioned in front of the rearmost first nozzle 23 of the first nozzle row 28.

The outer light sources 39 include front outer light sources 39 positioned in front of the inner light sources 38 and rear outer light sources 39 positioned in rear of the inner light sources 38. In a case that the center L0 of the first light source row 36 and the center M0 of the first nozzle row 28 are aligned with each other, the front outer light sources 39 are positioned in front of the frontmost first nozzle 23 of the first nozzle row 28, and the rear outer light sources 39 are positioned in rear of the rearmost first nozzle 23 of the first nozzle row 28.

Each of the first light source rows 36 includes at least one front outer light source 39 and at least one rear outer light source 39. Preferably, each of the first light source row 36 includes at least two front outer light sources 39 and at least two rear outer light sources 39. The number of the front outer light sources 39 and the number of the rear outer light sources 39 are identical to each other. In the example of FIG. 4, the front outer light sources 39 include a first outer light source 39*a* and a second outer light source 39*b*, and the rear outer light sources 39 include a first outer light source 39*a* and a second outer light source 39*b*. The first outer light sources 39*a* are more apart from the inner light sources 38 as compared with the second outer light sources 39*b*, in the front-rear direction. Each of the first outer light sources 39*a* is positioned at the end of the first light source row 36.

Each of the outer light sources 39 is a light emitting element capable of changing a radiant intensity that is an intensity of a light emitted (radiated) from the light emitting element, depending on an electric current supplied to the light emitting element. In the light emitting elements of the outer light sources 39, smaller the supplied electric current is, smaller the radiant intensity of the light to be emitted is. The control of the radiant intensity of the light may be PWM control of the electric current to be supplied to the outer light sources 39. An electric current supplied to the first outer light source 39*a* and an electric current supplied to the second outer light source 39*b* may be different from each other, and the intensity of the light emitted from the first outer light source 39*a* and the intensity of the light emitted from the second outer light source 39*b* may be different from each other. Note that the inner light sources 38 and the second light sources 34 may be a light emitting element configured to emit a light of constant intensity regardless of an electric current supplied to the light emitting element. Alternatively, like the outer light sources 39, the inner light sources 38 and the second light sources 34 may be a light emitting element configured to emit a light of intensity depending on an electric current supplied to the light emitting element.

The radiant intensity of the light is, for example, a radiant flux emitted from a unit area of the outer light source 39 in a unit time. The radiant intensity of the light is, for example, a radiant emittance [$W/cm^2$]. In a case that a distance between the outer light source 39 and the printing medium A is constant, larger the radiant intensity of the light radiated from the outer light source 39 is, an irradiation intensity being an intensity of a light coming into the printing medium A (a light with which the printing medium A is irradiated) is. The irradiation intensity is, for example, a radiant flux coming into a unit area of the printing medium A in a unit time. The irradiation intensity is, for example, an irradiance [$W/cm^2$].

<Controller>

As depicted in FIG. 2, the controller 60 is a computer configured to control each part of the printing apparatus 10, and includes an interface 61, a calculating unit 62, and a memory unit 63. The interface 61 is configured to receive various data such as image data etc. from an external device B such as a computer, a camera, a communication network, a storage medium, display and a printer etc. The image data is a raster data, and the like indicating an image to be printed on the printing medium A. Note that the controller 60 may be configured by single device, or may be configured by multiple devices located dispersedly and organized to cooperate for executing operations of the controller 60.

The memory unit 63 is a memory to which the calculating unit 62 can access. The memory unit 63 is configured by RAM, ROM and the like. The RAM stores various data such as printing data temporarily. The ROM stores a computer program for executing various data processing. Note that the computer program may be stored in a storage medium other than the memory unit 63. The computer program may be stored in single storage medium and/or may be stored dividedly in a plurality of storage media.

The calculating unit 62 is configured by a circuit such as a processor (for example, CPU and the like) and the like, for example. If the calculating unit 62 executes the computer program stored in the ROM, then the controller 60 controls the driving elements 27, the light sources 33, 34, the moving motor 44, and the conveying motor 54 so as to execute processing of printing the image on the printing medium A.

The controller 60 having such configuration is connected to the driving elements 27 in the heads 21, 22 via the head driving circuits 64 so as to control driving of the driving elements 27. Thus, discharging timings, discharging amounts, and the like of the inks discharged from the heads 21, 22 by the driving elements 27 are controlled. Further, the controller 60 is connected to the light sources 33, 34 of the irradiating parts 31, 32 via the light source driving circuit 65 so as to control driving of the light sources 33, 34. Thus, switching on and switching off of the light sources 33, 34 are controlled.

The controller 60 is connected to the moving motor 44 of the moving device 40 via the moving driving circuit 66 so as to control driving of the moving motor 44. Thus, moving of the heads 21, 22 and the irradiating parts 31, 32 by the moving device 40 is controlled. The controller 60 is connected to the conveying motor 54 of the conveying device 50 via the conveying driving circuit 67 so as to control driving of the conveying motor 54. Thus, conveying of the printing medium A by the conveying device 50 is controlled.

The controller 60 is connected to an external power source C such as source power supply (commercial power) and the like via a power source circuit 68. The power source circuit 68 is configured to generate output volage to each part of the printing apparatus 10 from alternating voltage of the external power source C, and supply electric power to the each part of the printing apparatus 10 such as the driving elements 27, the light sources 33, 34, the moving motor 44 and the conveying motor 54. The supply of the electric power is controlled by the controller 60. Thus, electric current to be supplied to the outer light sources 39 of the first light sources 33 is controlled, and consequently the intensity of the light from each of the outer light sources 39 is controlled based on the electric current. Note that predetermined electric current may be supplied to the inner light sources 38 of the first light sources 33 and the second light sources 34 so that a light having a predetermined intensity is emitted from those light sources. Alternatively, electric current corresponding to the type of the ink may be supplied to the inner light sources 38 of the first light sources 33 and the second light sources 34 so that a light having an intensity corresponding to the type of the ink is emitted from those light sources. In this case, a predetermined relationship between the type of the ink and the electric current may be stored in the memory unit 63.

<Printing Processing>

In the printing apparatus 10 having such configuration, the controller 60 obtains an image data, and executes a printing processing based on the image data. In the printing processing, at least one of a base printing in which a base is printed by the base ink, an image printing in which the image is printed by the color ink(s), and a clear printing in which a clear is printed by the clear ink. A printing mode for the clear printing includes a gloss printing mode and a mat printing mode. A condition of a surface of the printed clear ink differs between the gloss printing mode and the mat printing mode.

In the printing processing, the controller 60 executes a path operation. In the path operation, the inks are discharged from the heads 21, 22 to the printing medium A and the printing medium A is irradiated with the light from the irradiating parts 31, 32, while the head unit 11 is moved leftward. Thus, the inks from the heads 21, 22 land on the printing medium A, and the inks are irradiated with the light from the irradiating parts 31, 32. Then the controller 60 irradiates the inks with the light from the irradiating parts 31, 32 without discharging the inks from the heads 21, 22, while moving the head unit 11 rightward. Thus, the inks on the printing medium A are irradiated with the light from the irradiating part 31, 32. By the light with which the inks are irradiated, the inks are cured.

After the path operation, the controller 60 executes a conveying operation so as to convey the printing medium A frontward. In such a manner, the controller 10 proceeds the printing processing by repeating the path operation and the conveying operation for the printing medium A alternately. For example, in each conveying operation, the printing medium A may be conveyed frontward one fourth as long as the sizes of the landing areas D1, D2 of the ink. By doing so, the printing process may be proceeded while overlapping the landing areas D1, D2 of the ink and the irradiating areas E1, E2 of the light with respect to one path operation and the landing areas D1, D2 of the ink and the irradiating areas E1, E2 of the light with respect to the next path operation in the front-rear direction, respectively.

In the printing processing, in a case that the base printing is executed, the controller causes the first head 21 to execute a discharging operation of discharging the base ink to the printing medium A and causes the second irradiating part 32 to execute an irradiating operation of irradiating the base ink on the printing medium A with the light from the second irradiating part 32, in the path operation. Thus, the base ink from the first head 21 lands on the printing medium A, the base ink is irradiated with the light from the second irradiating part 32, and thereby a base composed of the base ink is printed on the printing medium A. A size of the base may be a predetermined size, or a size depending on an image data configured such that an image is printed on the base.

In the printing processing, in a case that the image printing is executed, the controller causes the second head 22 to execute a second discharging operation of discharging the color inks to the printing medium A and causes the first irradiating part 31 to execute a third irradiating operation of irradiating the color inks on the printing medium A with the light from the first irradiating part 31, in the path operation. Thus, the color inks from the first head 21 land on the printing medium A (that is, on the base, or directly on the printing medium A itself), the color inks are irradiated with the light from the first irradiating part 31, and the image by the color inks is printed on the printing medium A.

In the printing processing, in a case that the clear printing of the gloss printing mode is executed, the controller 60 causes the first head 21 to execute a first discharging operation of discharging the clear ink to the printing medium A and causes the first irradiating part 31 to execute a first irradiating operation of irradiating the clear ink on the printing medium A with the light from the first irradiating part 31, in the path operation. Thus, the clear ink from the first head 21 lands on the printing medium A (that is, on the base, on the image or on the printing medium A itself), the clear ink is irradiated with the light from the first irradiating part 31, and thereby a clear layer composed of the clear ink is printed on the printing medium A. A size of the clear ink layer may be a predetermined size, or a size depending on an image data configured such that the clear ink layer covers the base or the image.

In the printing processing, in a case that the clear printing of the mat printing mode is executed, the controller 60 causes the first head 21 to execute a first discharging operation of discharging the clear ink to the printing medium A and causes the second irradiating part 32 to execute a second irradiating operation of irradiating the clear ink on the printing medium A with the light from the second irradiating part 32, in the path operation. Thus, the clear ink from the first head 21 lands on the printing medium A (that is, on the base, on the image or on the printing medium A itself), the clear ink is irradiated with the light from the second irradiating part 32, and thereby a clear ink layer composed of the clear ink is printed on the printing medium A. A size of the clear ink layer may be a predetermined size, or a size depending on an image data configured such that the clear ink layer covers the base or the image.

In such a manner, in the mat printing mode, a clear ink discharged from the first head 21 is irradiated with the light from the second irradiating part 32 adjacent to the first head 21. Thus, in the mat printing mode, the first discharging operation by the first head 21 and the second irradiating operation by the second irradiating part 32 are executed in the same path operation.

In contrast, in the gloss printing mode, the clear ink discharged from the first head 21 is irradiated with the light from the first irradiating part 31. The first irradiating part 31 is more separated from the first head 21 as compared with the second irradiating part 32. Thus, in the gloss printing mode, the first discharging operation by the first head 21 and the first irradiating operation by the first irradiating part 31 are executed in path operations different from each other. For example, a case in which the printing medium A is conveyed one fourth as long as the size of the landing area D1 of the clear ink in each conveying operation is considered. In such case, if the clear ink is discharged from the first head 21 in the first path operation, the landing area D1 of the clear ink with respect to the first path operation arrives at the irradiating area E1 of the light from the first irradiating part 31 in the front-rear direction in the twelves path operation via twelve times of conveying operations. And then, the clear ink discharged by the first discharging operation of the first path operation is irradiated with the light from the first irradiating part 31 in the first irradiating operation of the twelves path operation, and consequently the clear ink is cured.

In such a manner, a time period from a timing when the clear ink is discharged from the first head 21 until a timing when the clear ink is irradiated with the light from the first irradiating part 31 in the gloss printing mode is longer than a time period from a timing when the clear ink is discharged from the first head 21 until a timing when the clear ink is irradiated with the light from the second irradiating part 32 in the mat printing mode. Thus, a surface of the clear ink in the gloss printing mode will have a gloss tone with no ups and downs and with gloss (luster) and shine. In contrast, a surface of the clear ink in the mat printing mode will have a mat tone with ups and downs and without gloss and shine.

<Control Method of the Irradiating Part>

In such a manner, in the image printing and in the clear printing of the gloss printing mode, the ink is irradiated with the light from the first irradiating part 31. The first irradiating part 31 is controlled differently between the image printing and the clear printing of the gloss printing mode. For example, in the third irradiating operation of the image printing, the controller 60 increases the intensity of the light, from the outer light source 39, with which the ink is irradiated as compared with the intensity of the light, from the outer light source 39, with which the ink is irradiated in the first irradiating operation of the gloss printing mode. Note that in the irradiating operation of the base printing and the second irradiating operation of the mat printing mode, the ink is irradiated with the light from the second irradiating part 32. In each of those operations, intensities of the lights, from the plurality of second light sources 34 of the second irradiating part 32, with which the ink is irradiated are identical to each other.

Specifically, in the third irradiating operation of the image printing, the controller 60 controls the power source circuit 68 such that the same electric current (that is, electric current of same magnitude) flows through each of the plurality of inner light sources 38 and each of the plurality of outer light sources 39 of the first irradiating part 31, for example. By doing so, each of the plurality of inner light sources 38 and each of the plurality of outer light sources 39 of the first irradiating part 31 irradiates the ink with a light having intensities identical to each other. Since the outer light sources 39 are arranged outside the landing area D2 of the color ink, the color ink on the printing medium A can be irradiated with the light having large illuminance from the first irradiating part 31 even at the end or edge portion of the landing area D2. Thus, if the illuminance required for curing the color ink is greater than the illuminance required for curing the clear ink, the color ink can be cured in entire of the landing area D2 including the end or edge portion.

In the clear printing of the gloss printing mode, a line (streak) may be occurred in the clear ink due to irradiating of the clear ink with the light from the first irradiating part 31. Thus, in the first irradiating operation, the controller 60 makes an intensity of the light, from each of the outer light sources 39 of the first irradiating part 31, with which the clear ink is irradiated smaller as compared with an intensity of the light, from each of the inner light sources 38 of the first irradiating part 31, with which the clear ink is irradiated. For example, the intensity of the light, from each of the outer light sources 39, with which the clear ink is irradiated is not less than 50% and not more than 80% of the intensity of the light, from each of the inner light sources 38, with which the clear ink is irradiated.

That is, the controller 60 controls the power source circuit 68 so that the same electric current (that is, electric current of same magnitude) flows to each of the plurality of inner light sources 38 of the first irradiating part 31, and an electric current smaller than the electric current for each of the plurality of inner light sources 38 flows to each of the outer light sources 39. Thus, each of the plurality of inner light sources 38 of the first irradiating part 31 irradiates the ink with a light having intensities identical to each other, and each of the outer light sources 39 irradiates the ink with a light having the intensity smaller than that of each of the inner light source 38. Further, the controller 60 controls the power source circuit 68 so that the same electric current flows to the first outer light source 39*a* of the front outer light sources 39 and the first outer light source 39*a* of the rear outer light sources 39, and the same electric current flows to the second outer light source 39*b* of the front outer light sources 39 and the second outer light source 39*b* of the rear outer light sources 39. Thus, the first outer light source 39*a* of the front outer light sources 39 and the first outer light source 39*a* of the rear outer light sources 39 irradiate the ink with lights having intensities identical to each other, and the second outer light source 39*b* of the front outer light sources 39 and the second outer light source 39*b* of the rear outer light sources 39 irradiate the ink with lights having intensities identical to each other.

Figure 5:
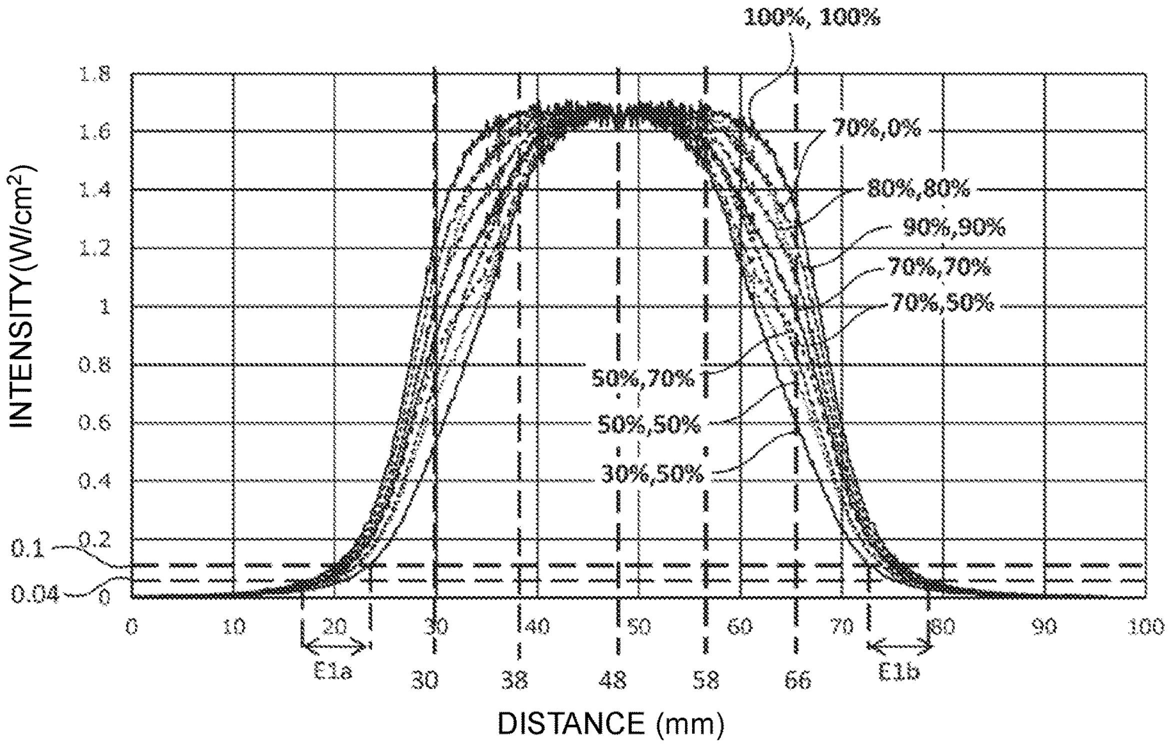
FIG. 5 is a graph depicting a light intensity distribution of a light, from the first irradiating part, with which the ink is irradiated, at a printing medium.
Figure 6:
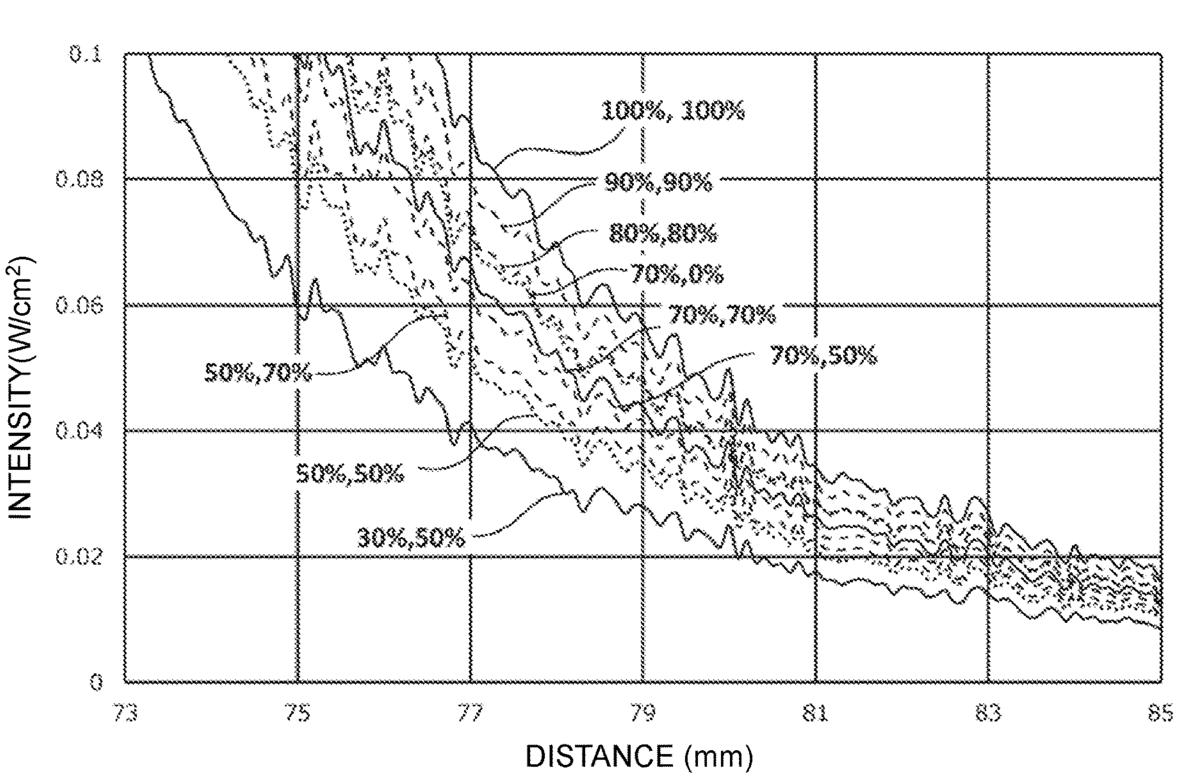
FIG. 6 is an enlarged view depicting a part, of the graph of FIG. 5, depicting the part in which the intensity of the light from the first irradiating part is in a range of between 0 to 0.1 [W/cm$^2$].

For example, the ink on the printing medium A is irradiated with the light from the first irradiating part 31 with an intensity distribution such as exemplified by the light intensity distribution graphs of FIG. 5 and FIG. 6. In the exampled graphs of FIGS. 5 and 6, the horizontal axis indicates a distance [mm] in the front-rear direction from a predetermined position on the printing medium A, and the vertical axis indicates an intensity [W/cm$^2$] of a light, from the first irradiating part 31, with which the printing medium A is irradiated.

Note that in FIGS. 5 and 6, the label of the graph is described in the order of the light intensity of the first outer light source 39*a*, the light intensity of the second light source 39*b*. For example, the graph corresponding to the label of "70%, 50%" indicates the intensity of the light from the first irradiating part 31 in a case that the light intensity of the first outer light source 39*a* is 70% and the light intensity of the second outer light source 39*b* is 50%. The light intensity of the first outer light source 39*a* and the light intensity of the second outer light source 39*b* is indicated by a rate with respect to an intensity of the light from each of the inner light sources 38. The intensity of the light from the outer light source 39 is the product of the intensity of the light from each of the inner light source 38 times the rate. For example, the intensity of the light from the outer light source 39 of which rate is 100% is identical to the intensity of the light from the inner light source 38, and the intensity of the light from the outer light source 39 of which rate is 50% is half of the intensity of the light from the inner light source 38.

The intensity distribution of the light, from the first irradiating part 31, with which the ink is irradiated, on the printing medium A has a shape symmetric in the front-rear direction. In the intensity distribution of the light, the distance 48 mm corresponds to the center L0 in the front-rear direction of the first light source row 36, the distance 38 mm corresponds to the frontmost inner light source 38, the distance 58 mm corresponds to the rearmost inner light source 38, the distance 30 mm corresponds to the frontmost outer light source 39, the distance 66 mm corresponds to the rearmost outer light source 39. In such a manner, the intensity distribution of the light, from the front outer light sources 39, with which the ink is irradiated and the intensity distribution of the light, from the rear outer light sources 39, with which the ink is irradiated, are mutually symmetric in the front-rear direction. That is, the intensity distribution on the printing medium A in the front-rear direction indicating intensity of light from the outer light sources 39 in front of the inner light sources 38 is symmetric with the intensity distribution on the printing medium A in the front-rear direction indicating intensity of light from the outer light sources 39 in rear of the inner light sources 38.

In the intensity distribution of the light, a part in which the intensity of the light is not less than 0.04 [W/cm$^2$] and not more than 0.1 [W/cm$^2$] corresponds to each of a front end part Ela and a rear end part E1*b* of the irradiating area E1 of the light. In the front end part Ela and the rear end part E1*b* of the irradiating area E1, the clear ink is irradiated with the light, from the first irradiating part 31, having a predetermined intensity, and thus a line in the clear ink likely to be occurred. A gradient (inclination) of the intensity distribution of the light contribute to the occurrence of the line. The gradient of the intensity distribution of the light is, for example, a gradient in the part in which the intensity of the light is not less than 0.04 [W/cm$^2$] and not more than 0.1 [W/cm$^2$], and is determined mainly based on the light intensities of the first outer light source 39*a* and the second outer light source 39*b*.

Like the exampled table in FIG. 7, the light intensities of the first outer light source 39*a* and the second outer light source 39*b* and the gradient of the intensity of the light correspond to each other. In the table, each of the light intensities of the first outer light source 39*a* and the second outer light source 39*b* are indicated by a rate relative to the intensity of the light from the inner light source 38. The intensity of the light from the outer light source 39 is the product of the intensity of the light from the inner light source 38 times the rate.

The gradient of the intensity distribution of the light is a gradient of the graph of the intensity of the light relative to a distance, in the front end part Ela and the rear end part E1*b* of the irradiating area E1 of the light. The gradient θ of the intensity distribution of the light is indicated by a ratio (θ/θ0) being a ratio of the gradient θ relative to a gradient θ0 of the intensity distribution of the light in a case that the intensity of each of the first outer light source 39*a* and the second outer light sources 39*b* is 100%. For example, in a case that the intensity of the light from each of the outer light source 39*a* and the outer light source 39*b* is 80%, the gradient θ is indicated as (θ/θ0)=0.881, that is the gradient θ (=θ0×0.881) is smaller than the gradient θ0 in a case that the intensity of each of the first outer light source 39*a* and the second outer light sources 39*b* is 100%. As depicted in FIG. 7, in principle, if the intensity of each of the first outer light source 39*a* and the second outer light sources 39*b* is less than 100%, the ratio (θ/θ0) is less than 1. That is, the gradient θ of the intensity distribution is smaller. Note that, in FIG. 7, in a case that the intensity of the light from the outer light source 39*a* is 30% and the intensity of the light from the second outer light source 39*b* is 50%, the gradient θ is indicated as (θ/θ0)=1.000, that is the gradient θ is same as the gradient θ0 in a case that the intensity of each of the first outer light source 39*a* and the second outer light sources 39*b* is 100%. However, according to careful consideration of the inventor, the data in which the intensity of the light from the outer light source 39*a* is 30% and the intensity of the light from the second outer light source 39*b* is 50% is exceptional data, and the data does not damage the technical feature of making the intensity of each of the first outer light source 39*a* and the second outer light sources 39*b* smaller than the intensity of the light from the inner light source 38 results in smaller gradient θ (and consequently, the occurrence of the line is reduced).

As depicted in the examples of FIGS. 8A and 8B, the clear ink has a boundary part F0 between a part F1 which is cured by the light from the first irradiating part 31 in the present path and the part F2 which is cured by the light from the first irradiating part 31 in the next path. Regarding a width of the boundary part F0, the larger the gradient θ of the intensity distribution of the light is, the smaller the width is. For example, the gradient θ of the intensity distribution of the light with which the clear ink F in FIG. 8A is irradiated is larger than the gradient θ of the intensity distribution of the light with which the clear ink F in FIG. 8B is irradiated. In such a case, a width W1 of the boundary part F0 in the clear ink F in FIG. 8A is smaller than a width W2 of the boundary part F0 in the clear ink F in FIG. 8B.

If the width of the boundary part F0 in the front-rear direction is small (narrow), the line is visible due to reflection of a light at the boundary part F0. In view of such situation, by making the intensity of the light from the outer light source 39 smaller than the intensity of the light from the inner light source 38, the gradient θ of the intensity distribution of the light is made smaller and the width of the boundary part F0 is made wider, and consequently the occurrence of the line can be reduced. Further, if the intensity of the light from the outer light source 39 is made not less than 50% and not more than 80% of the intensity of the light from the inner light source 38, the occurrence of the line can be reduced.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Note that all embodiments described above may be combined with each other unless the embodiments contradict each other. Many improvements and other embodiments are clear to one of ordinary skills in the art in view of the above description. Thus, the above description should be interpreted as examples, and the above description is provided in order to teach one of ordinary skills in the art the best mode for executing the disclosure. Details of the structures and/or the functions can be substantially modified without deviating from the spirit of the disclosure.

In the above embodiment, the second head 22 and the second irradiating part 34 may be omitted. In such a configuration, the first head 21 and the first irradiating part 33 may be arranged side by side in the left-right direction. In the above embodiment, each of the front and rear outer light sources 39 may include only one light source 39 or may include more than two light sources 39.

The printing apparatus of the above embodiments is useful as a printing apparatus etc. capable of reducing occurrence of a line in a clear ink.

What is claimed is:

1. A printing apparatus comprising:

a first head including a plurality of first nozzles configured to discharge a clear ink having photo-curing property to a printing medium;

a first irradiator including a plurality of first light sources configured to irradiate the clear ink on the printing medium with a light;

a carriage configured to move the first head and the first irradiator in a first direction;

a conveyor configured to convey the printing medium in a second direction crossing the first direction; and a controller wherein the plurality of first nozzles is arranged along the second direction so as to constitute a nozzle row;

the plurality of first light sources is arranged along the second direction so as to constitute a light source row longer than the nozzle row, the plurality of first light sources including an inner light source, a first outer light source and a second outer light source, the inner light source being interposed between the first and second outer light sources in the second direction;

in a case that a center in the second direction of the light source row and a center in the second direction of the nozzle row are aligned with each other in the second direction, the inner light source is positioned within a range over which the nozzle row extends, and the first and second outer light sources are positioned outside the range over which the nozzle row extends;

the controller is configured to cause:

the first head to execute a first discharging operation of discharging the clear ink to the printing medium; and the first irradiator to execute a first irradiating operation of irradiating the clear ink on the printing medium with the light from the first irradiator; and the controller is configured to make an intensity of the light, from each of the first and second outer light sources, with which the clear ink is irradiated smaller than an intensity of the light, from the inner light source, with which the clear ink is irradiated, in the first irradiating operation.

2. The printing apparatus according to claim 1, wherein distribution in the second direction of the intensity of the light from the first outer light source and distribution in the second direction of the intensity of the light from the second outer light source are mutually symmetric.

3. The printing apparatus according to claim 1, wherein the intensity of the light from each of the first outer light source and the second outer light source is not less than 50% of the intensity of the light from the inner light source and not more than 80% of the intensity of the light from the inner light source.

4. The printing apparatus according to claim 1, wherein the first outer light source includes at least two light sources and the second outer light source includes at least two light sources.

5. The printing apparatus according to claim 1, further comprising:

a second head which includes a plurality of second nozzles configured to discharge a color ink having photo-curing property to the printing medium, and which is arranged side by side with the first irradiator in the first direction; and a second irradiator which includes a plurality of second light sources configured to irradiate the clear ink on the printing medium with a light, and which is arranged side by side with the first head in the first direction, wherein:

a printing mode includes a mat printing mode and a gloss printing mode; and the controller is configured to cause:

the first irradiator to execute the first irradiating operation of irradiating the clear ink on the printing medium with the light from the first irradiator in the gloss printing mode, and the second irradiator to execute a second irradiating operation of irradiating the clear ink on the printing medium with the light from the second irradiator in the mat printing mode.

6. The printing apparatus according to claim 5, wherein the controller is configured to cause:

the second head to execute a second discharging operation of discharging the color ink to the printing medium, and the first irradiator to execute a third irradiating operation of irradiating the color ink on the printing medium with the light from the first irradiator.

7. The printing apparatus according to claim 6, wherein the controller is configured to make an intensity of the light, from the first and second outer light sources, with which the color ink is irradiated in the third irradiating operation larger than the intensity of the light, from the first and second outer light sources, with which the clear ink is irradiated in the first irradiating operation, respectively.

8. A control method for a printing apparatus, the printing apparatus including:

a first head including a plurality of first nozzles configured to discharge a clear ink having photo-curing property to a printing medium;

a first irradiator including a plurality of first light sources configured to irradiate the clear ink on the printing medium with a light;

a carriage configured to move the first head and the first irradiator in a first direction; and a conveyor configured to convey the printing medium in a second direction crossing the first direction;

the plurality of first nozzles is arranged along the second direction so as to constitute a nozzle row;

the plurality of first light sources is arranged along the second direction so as to constitute a light source row longer than the nozzle row, the plurality of first light sources including an inner light source, a first outer light source and a second outer light source, the inner light source being interposed between the first and second outer light sources in the second direction; and in a case that a center in the second direction of the light source row and a center in the second direction of the nozzle row are aligned with each other in the second direction, the inner light source is positioned within a range over which the nozzle row extends, and the first and second outer light sources are positioned outside the range over which the nozzle row extends;

the method comprising:

causing the first head to execute a first discharging operation of discharging the clear ink to the printing medium;

causing the first irradiator to execute a first irradiating operation of irradiating the clear ink on the printing medium with the light from the first irradiator; and making an intensity of the light, from each of the first and second outer light sources, with which the clear ink is irradiated smaller than an intensity of the light, from the inner light source, with which the clear ink is irradiated, in the first irradiating operation.

* * * * *